US006909569B2

(12) United States Patent
Makita et al.

(10) Patent No.: US 6,909,569 B2
(45) Date of Patent: Jun. 21, 2005

(54) LOW IMPEDANCE SEMICONDUCTOR INTEGRATED CIRCUIT

(75) Inventors: Chikao Makita, Tokyo (JP); Hideki Miyake, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 246 days.

(21) Appl. No.: 10/277,799

(22) Filed: Oct. 23, 2002

(65) Prior Publication Data

US 2003/0202272 A1 Oct. 30, 2003

(30) Foreign Application Priority Data

Apr. 26, 2002 (JP) .................................... 2002-125798

(51) Int. Cl.[7] .............................................. G11B 5/03
(52) U.S. Cl. ................................... 360/66; 360/67
(58) Field of Search .......................... 360/66, 67, 46; 327/530, 537, 541, 546; 330/253, 259, 261, 285, 62, 129, 135

(56) References Cited

U.S. PATENT DOCUMENTS

2002/0048110 A1 * 4/2002 Sako et al. .................... 360/68

FOREIGN PATENT DOCUMENTS

| JP | 138201 A | * | 5/1996 | .................. 360/66 |
| JP | 268302 A | * | 9/2000 | .................. 360/66 |

* cited by examiner

Primary Examiner—Alan T. Faber
(74) Attorney, Agent, or Firm—Leydig, Voit & Mayer, Ltd.

(57) ABSTRACT

One circuit generates a constant positive potential, another circuit generates a constant negative potential. The positive potential and the negative potential are applied to a magneto-resistive head that reads data from and writes data to a magnetic disk. The positive potential is generated using a positive voltage source, an operational amplifier, and an NMOS transistor. The negative potential is generated using a negative voltage source, an operational amplifier, and a PMOS transistor.

8 Claims, 7 Drawing Sheets

LOW IMPEDANCE SEMICONDUCTOR INTEGRATED CIRCUIT

BACKGROUND OF THE INVENTION

1) Field of the Invention

The present invention relates to a semiconductor integrated circuit that inputs a signal produced by a magneto-resistance (MR) head to a circuit provided at the next stage.

2) Description of the Related Art

Conventionally, a signal that is read from a magnetic recording medium using a magneto-resistive (MR) head is input into a read amplifier circuit. A constant current (current bias) is applied to the MR head and the change in voltage due to the change in the resistance is measured. For the sake of explanation this method will be termed as voltage sensing method.

The MR elements are the electronic components that display the MR effect. The MR effect implies that the electrical resistance changes when the material is magnetized and the resistance goes back to the original value when the magnetic field is turned off. The MR elements include a giant magneto-resistive (GMR) element, a tunnel magneto-resistive (TMR) element, and the like.

FIG. 7 shows the configuration of a conventional circuit that employs the voltage sensing method. In FIG. 7, reference numeral 1 denotes an MR head and 2 denotes a read amplifier. The MR head has two terminals. A resistor R11 is connected to one terminal of the MR head 1. A resistor R12 is connected to the other terminal of the MR head 1. The resistors R11 and R12 are of equal resistance. The potential of a node c between the resistors R11 and R12 is made equal to a ground potential (GND) by an operational amplifier OP2. The MR head 1 reads data from a not shown magnetic disc. The MR head 1 frequently collides with the disk due to the vibration and the like. As a result of the collision excess current is generated causing the destruction of MR head 1.

A current source CS1 determines the amount of bias current Imr flowing to the MR head 1. The bias current Imr is determined based on a current Is and the resistance of resistors R9 and 10. The value of bias current Imr is obtained based on the equation:

$$Imr = RR9/RR10 \times Is, \quad (1)$$

where RR9 and RR10 are the resistances of the resistors R9 and R10 respectively and Is is the current that flows from a positive power supply voltage Vcc to the current source CS1 through the resistor R9.

Resistors R5 and R6 are connected to each other to avoid the influence of the parasitic capacitance of an NMOS transistor NM1 and a PMOS transistor PM1. Capacitors C1 to C3 are provided to eliminate noise caused by the bias current Imr. A voltage vin is calculated based on the equation:

$$vin = Imr \times rmr, \quad (2)$$

where rmr is the resistance of MR head 1.

The advantages of the conventional circuit are that it has a high frequency range and a fast switching rate of bias current Imr. Nevertheless, the conventional circuit is a high impedance circuit as it carries a constant current to the MR head. Hence the desired amount of current Imr for MR head 1 is not generated due to parasitic inductance, parasitic resistance, and parasitic conductance. The parasitic inductance, parasitic resistance, and parasitic conductance are generated by a wire that connects the MR head to the integrated circuit (IC). The conventional circuit also has a problem of noise entering the circuit. The noise enters the circuit from another circuit like a write current driver. The write current driver operates at a high speed in the IC.

SUMMARY OF THE INVENTION

It is an object of the present invention to provide a semiconductor integrated circuit having low impedance. It is also an object of the present invention to prevent destruction due to excess current and improve resistance to parasitic elements and noise in the circuit.

In the semiconductor device according to one aspect of the present invention, a bias voltage is applied to a magneto-resistive head. A positive constant potential is supplied to one terminal of the magneto-resistive head. The positive constant potential is generated by a circuit that generates a positive constant voltage and also sets a reference potential to the ground potential. A negative constant potential is supplied to another terminal of the magneto-resistive head. The negative constant potential is generated by a circuit that generates a negative constant voltage.

In the semiconductor device according to another aspect of the present invention, the source of a negative metal-oxide semiconductor transistor is connected to a first terminal of a magneto-resistive head through a resistor and the drain of the negative metal-oxide semiconductor transistor is connected to a first power source and the gate is connected to a first operational amplifier. A positive voltage source is connected to the non-inversion input terminal of the first operational amplifier. The inversion input terminal of the first operational amplifier is connected to the first terminal of the magneto-resistive head. The source of a positive metal-oxide semiconductor transistor is connected to a second terminal of the magneto-resistive head through a resistor. The drain of the positive metal-oxide semiconductor transistor is connected to a second power source and the gate is connected to a second operational amplifier. A negative voltage source is connected to the non-inversion input terminal of the second operational amplifier. The inversion input terminal of the second operational amplifier is connected to the second terminal of the magneto-resistive head.

These and other objects, features and advantages of the present invention are specifically set forth in or will become apparent from the following detailed descriptions of the invention when read in conjunction with the accompanying drawings.

DETAILED DESCRIPTIONS

The embodiments of the semiconductor integrated circuit according to the present invention will be explained below, with reference to the accompanying drawings.

Figure 1:
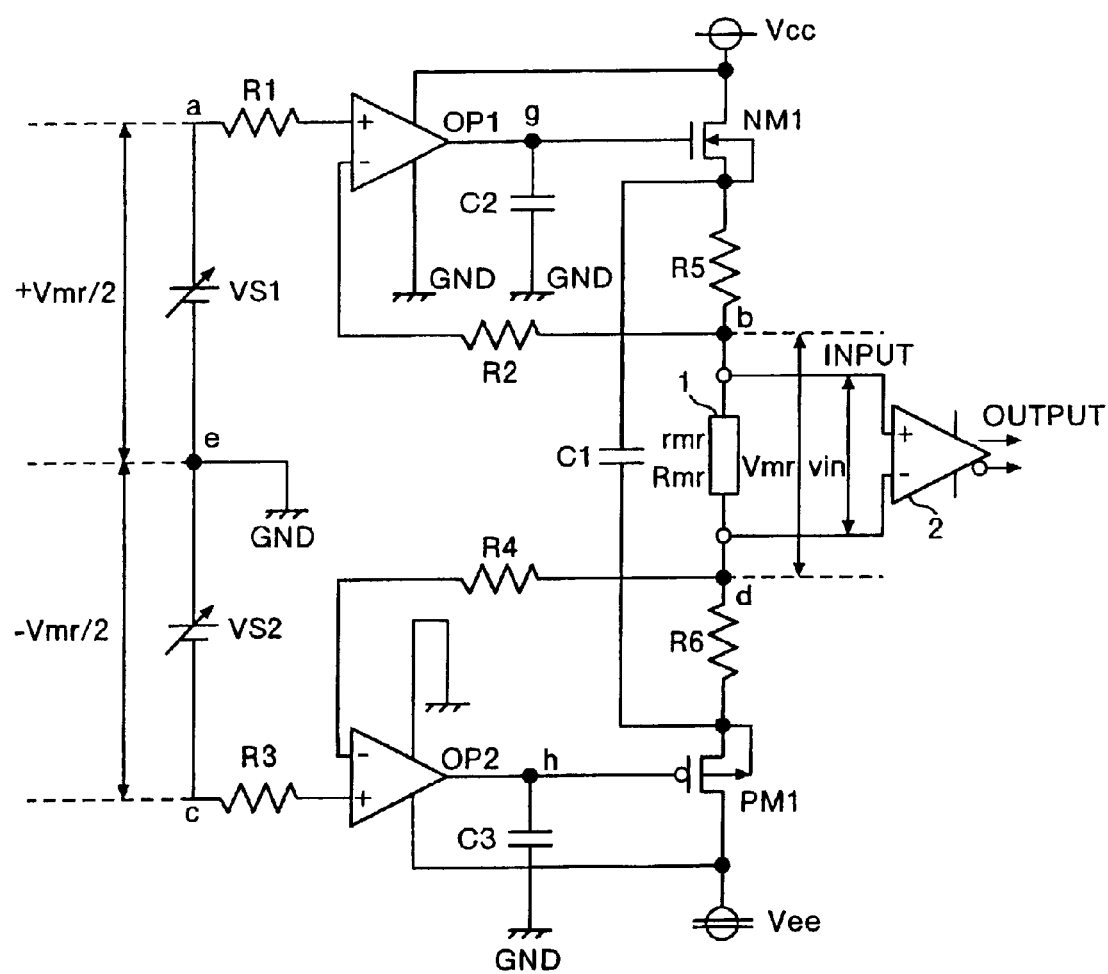
FIG. 1 shows a circuit configuration of a semiconductor integrated circuit according to a first embodiment of the present invention.

FIG. 1 shows a circuit configuration of a semiconductor integrated circuit according to the first embodiment of the present invention. Reference numeral 1 denotes an MR head and reference numeral 2 denotes a read amplifier circuit.

Figure 7:
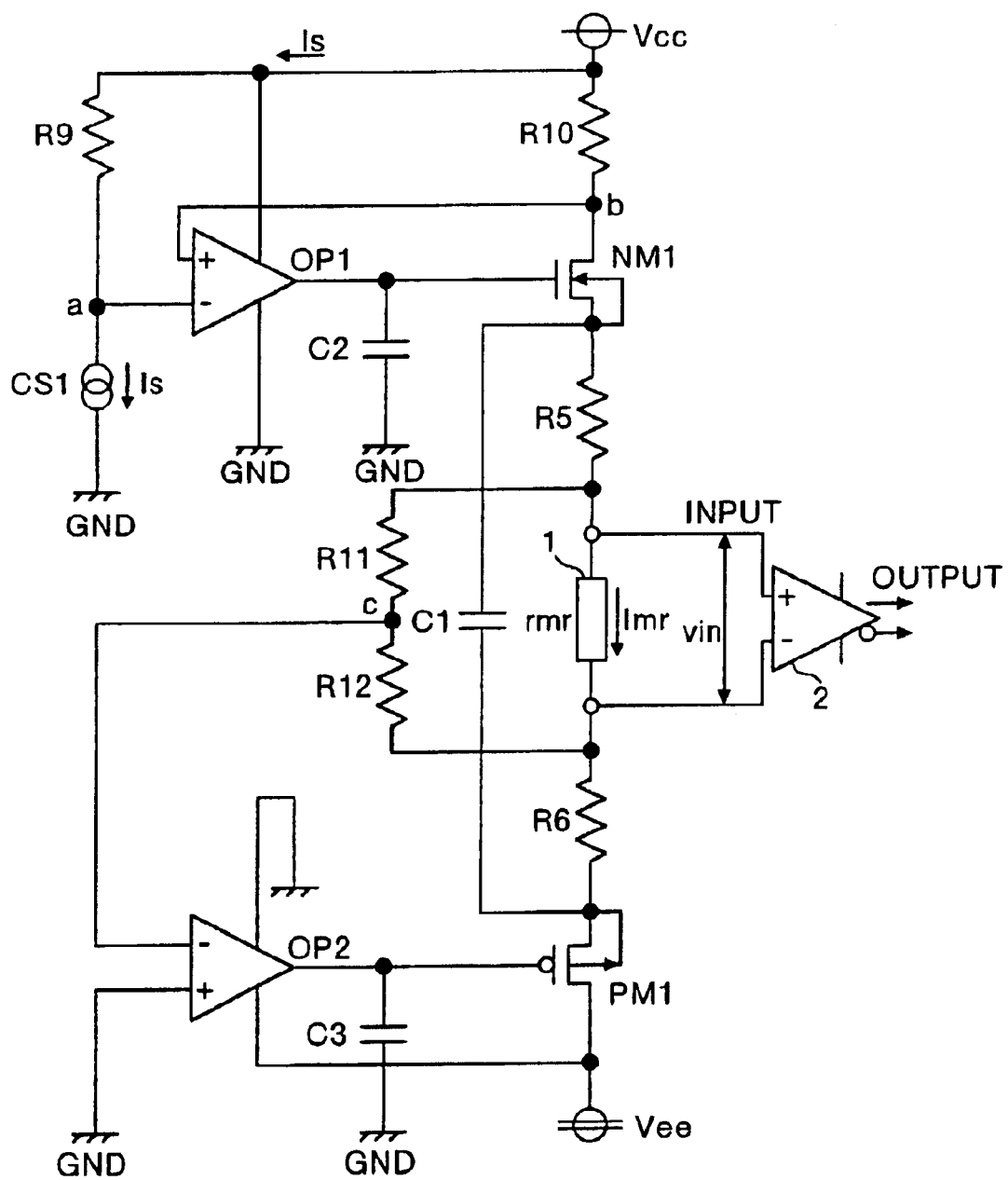
FIG. 7 shows a circuit configuration of a conventional semiconductor integrated circuit.

In the conventional circuit the current Imr is obtained based on the equation (1), and the voltage vin is determined based on equation (2) as explained above. On the other hand, as shown in FIG. 1, a MR head bias voltage Vmr is applied between nodes b and d of the MR head. This is in contrast with the conventional circuit shown in FIG. 7. Voltage vin is obtained based on equation:

$$vin = Vmr/Rmr \times rmr, \quad (3)$$

where Rmr is the resistance of the MR head 1 when no signal is input into the read amplifier circuit 2 and rmr is the resistance of the MR head 1 when a signal is input into the read amplifier circuit 2. The voltage vin is applied to the read amplifier circuit 2.

The process of obtaining the MR head bias voltage Vmr will be explained in detail. A node e of voltage sources VS1 and VS2 is grounded. A potential of node a is set at +Vmr/2. The node a is connected to the non-inversion input terminal of an operational amplifier OP1 through a resistor R1. The output of the operational amplifier OP1 is connected to the gate of the NMOS transistor NM1. The output of the operational amplifier OP1 is also connected to a one terminal of a capacitor C2 through a node g. The other terminal of the capacitor C2 is grounded. The drain of the NMOS transistor NM1 is connected to a power supply Vcc and the source is connected to the node b through a resistor R5. The node b is connected to the inversion input terminal of the operational amplifier OP1 through a resistor R2.

The potential of the node c is set at −Vmr/2. The node c is connected to the non-inversion input terminal of an operational amplifier OP2 through a resistor R3. The output of the operational amplifier OP2 is connected to the gate of a PMOS transistor PM1. The output of the operational amplifier OP2 is also connected to one terminal of a capacitor C3 through a node h. The other terminal of the capacitor C3 is grounded. The drain of the PMOS transistor PM1 is connected to a negative power supply voltage Vee. The source of the PMOS transistor PM1 is connected to the node d through a resistor R6. The node d is connected to the inversion input terminal of the operational amplifier OP2 through a resistor R4. A capacitor C1 is connected between the source of the NMOS transistor NM1 and the source of the PMOS transistor PM1.

The operational amplifier OP1 equalizes the potential of the nodes a and b. The operational amplifier OP2 equalizes the potential of the nodes c and d. Therefore, it is possible to set the potential between the nodes b and d as MR head bias voltage Vmr. The intermediate potential between the nodes b and d is set to ground potential (GND) because the node e is grounded. This prevents the destruction of the circuit due to excess current. The amplitude of MR head bias voltage Vmr can thus be set by changing the amplitude of voltage generated from voltage sources VS1 and VS2.

The resistors R5 and R6 are connected to each other in order to avoid the influence of the parasitic capacitance caused by NMOS transistor NM1 and PMOS transistor PM1. The resistors R5 and R6 also aid in adjusting the impedance in the circuit. The capacitors C1 to C3 control the current Imr which flows to MR head 1. The capacitors C1 to C3 also aid in reducing the noise of the operational amplifiers and the noise generated during switching of mode. Although the capacitors C1 to C3 have been shown in the diagram, they may not be provided.

The voltage vin is generated based on the change in resistance of MR head 1 and the constant current of the circuit. The voltage vin is applied to the read amplifier circuit 2. A feedback is provided to make the voltage at the two terminals of the MR head 1 to the MR head bias voltage Vmr. An AC low signal that represents the voltage vin is generated as the resistance of the MR head 1 changes faster than the feedback obtained. The resistance of MR head 1 changes due to change in magnetic force.

Because of applying a constant voltage to the MR head, the semiconductor integrated circuit according to the first embodiment has lower impedance than the conventional circuit. Moreover, the semiconductor integrated circuit according to the first embodiment can cope with the influence of the parasitic element if it is generated. In addition, the semiconductor integrated circuit according to the first embodiment suppresses the noise.

Figure 2:
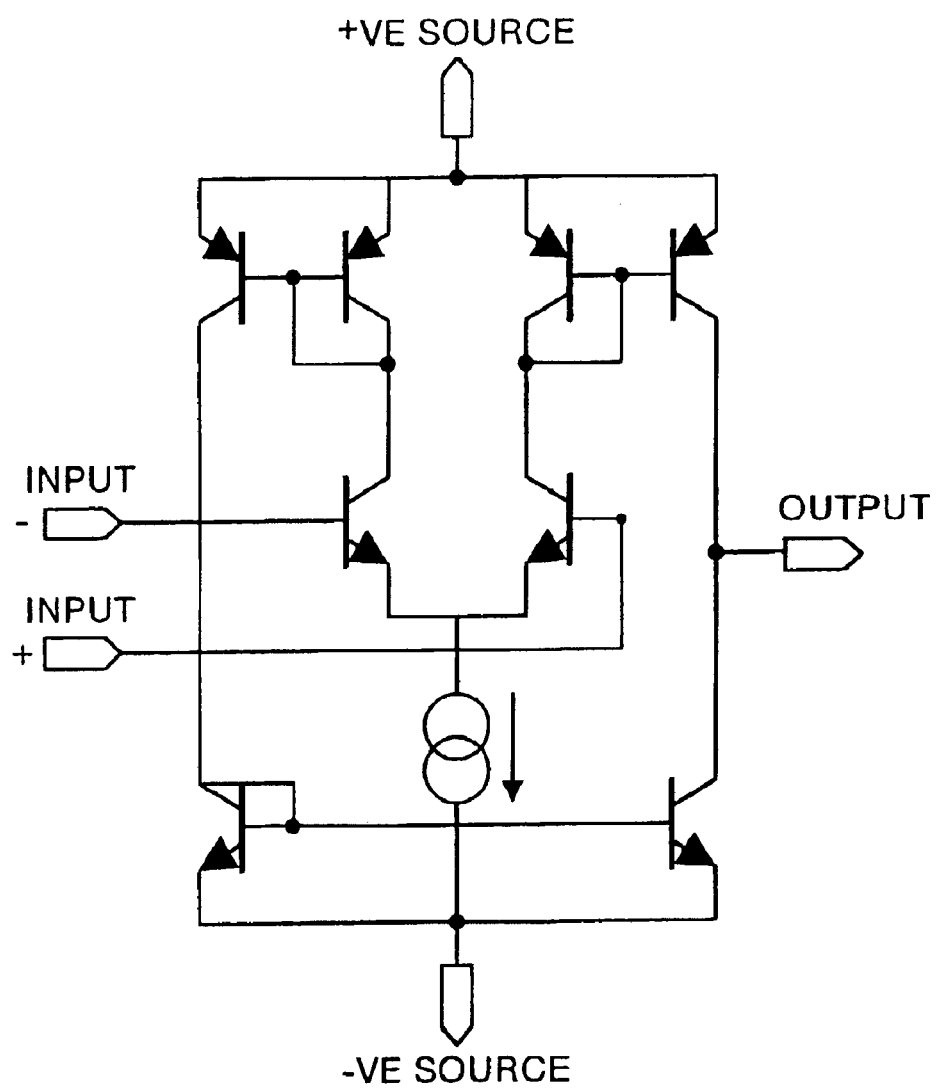
FIG. 2 shows a circuit configuration of one example of an operational amplifier shown in FIG. 1.

FIG. 2 shows one example of the circuit configuration of the operational amplifier OP1 (or OP2) shown in FIG. 1. Since the circuit configuration of the operational amplifier is well known, an explanation about the configuration will be omitted. Moreover, any other circuits that operate in the same manner as the circuit shown in FIG. 2 can also be employed as the operational amplifiers.

Figure 3:
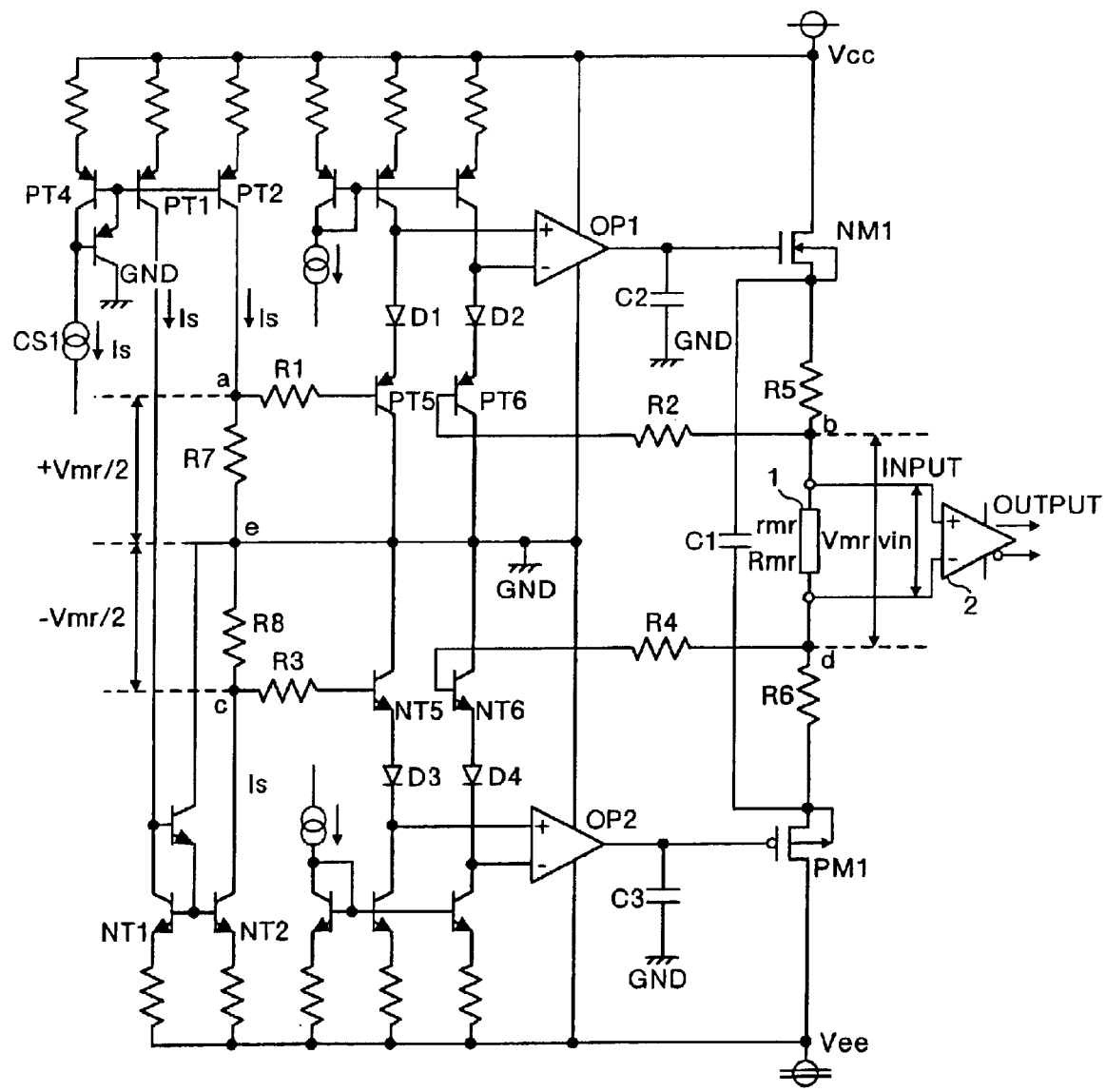
FIG. 3 shows a circuit configuration of a semiconductor integrated circuit according to a second embodiment of the present invention.

FIG. 3 shows a circuit configuration of a semiconductor integrated circuit according to a second embodiment of the present invention. A current Is flows to a current source CS1 from the collector of a PNP transistor PT4. PNP transistors PT1, PT2, and PT4 form a current mirror circuit. NPN transistors NT1 and NT2 are connected to form another current mirror circuit. The collector current of the transistors PT1, PT2, PT4, NT1, and NT2 is represented by Is. The collector current Is of the PNP transistor PT1 flows to the collector of a NPN transistor NT1. The collector current Is of the PNP transistor PT2 flows to the collector of the NPN transistor NT2 through resistors R7 and R8.

Resistors R7 and R8 are equal in resistance and a node e between the resistors R7 and R8 is connected to a ground potential GND. The collector current Is of the PNP transistor PT2 flows to resistor R7. The potential across resistor R7 is +Vmr/2. The potential +Vmr/2 is generated due to the current Is and the resistor R7. The collector current Is of the NPN transistor NT2 flows to resistor R8. The potential across resistor R7 is −Vmr/2. The potential −Vmr/2 generated due to the current Is and the resistor R8. The sum of potential of +Vmr/2 and −Vmr/2 equals to MR head bias voltage Vmr. Thus the MR head bias voltage Vmr is dependent on current Is as the MR head bias voltage Vmr can be set by changing current Is.

The potential +Vmr/2 is applied to the non-inversion input terminal of an operational amplifier OP1 through a resistor R1, a PNP transistor PT5, and a diode D1. The emitters of PNP transistors PT5 and PT6 are connected to the non-inversion input terminal and the inversion input terminal of the operational amplifier OP1 respectively forming an emitter follower. The operational amplifier OP1 receives feedback from a NMOS transistor NM1. The potential of a node a is made equal to that of the node b. The node b is connected to the positive terminal of the MR head 1. The node b is also connected to the inversion input terminal of the operational amplifier OP1 through a resistor R2, the PNP transistor PT6, and a diode D2. The resistors R1 and R2 have equal resistance.

The potential −Vmr/2 is applied to the non-inversion input terminal of an operational amplifier OP2 through a resistor R3, an NPN transistor NT5, and a diode D3. The emitters of the NPN transistors NT5 and NT6 are connected to the non-inversion input terminal and inversion input terminal of the operational amplifier OP2 respectively, to form another emitter follower. The operational amplifier OP2 receives feedback from a PMOS transistor PM1. The potential of a node c is made equal to that of the node d. The node d is connected to the negative terminal of the MR head 1. The node d is also connected to the inversion input terminal of the operational amplifier OP2 through a resistor R4, the NPN transistor NT6, and a diode D4. The resistors R3 and R4 have equal resistance.

The diodes D1, D2, D3, and D4 are arranged to direct the flow of current from the operational amplifiers OP1 and OP2 in the required direction. The provision of the diodes depends on the configuration of the operational amplifiers OP1 and OP2. Therefore the diodes are not always provided. The resistors R5 and R6, capacitors C1 to C3, and AC low signal have already been explained in connection to the first embodiment, so their explanation will be omitted.

According to the second embodiment, the constant current sources and resistors generate the MR head bias voltage Vmr using the current mirror circuits. The MR head bias voltage Vmr is applied to the operational amplifiers OP1 and OP2 through the emitter follower circuits. Hence it is possible to control the change in MR bias voltage Vmr by controlling the input of current to the operational amplifiers.

Figure 4:
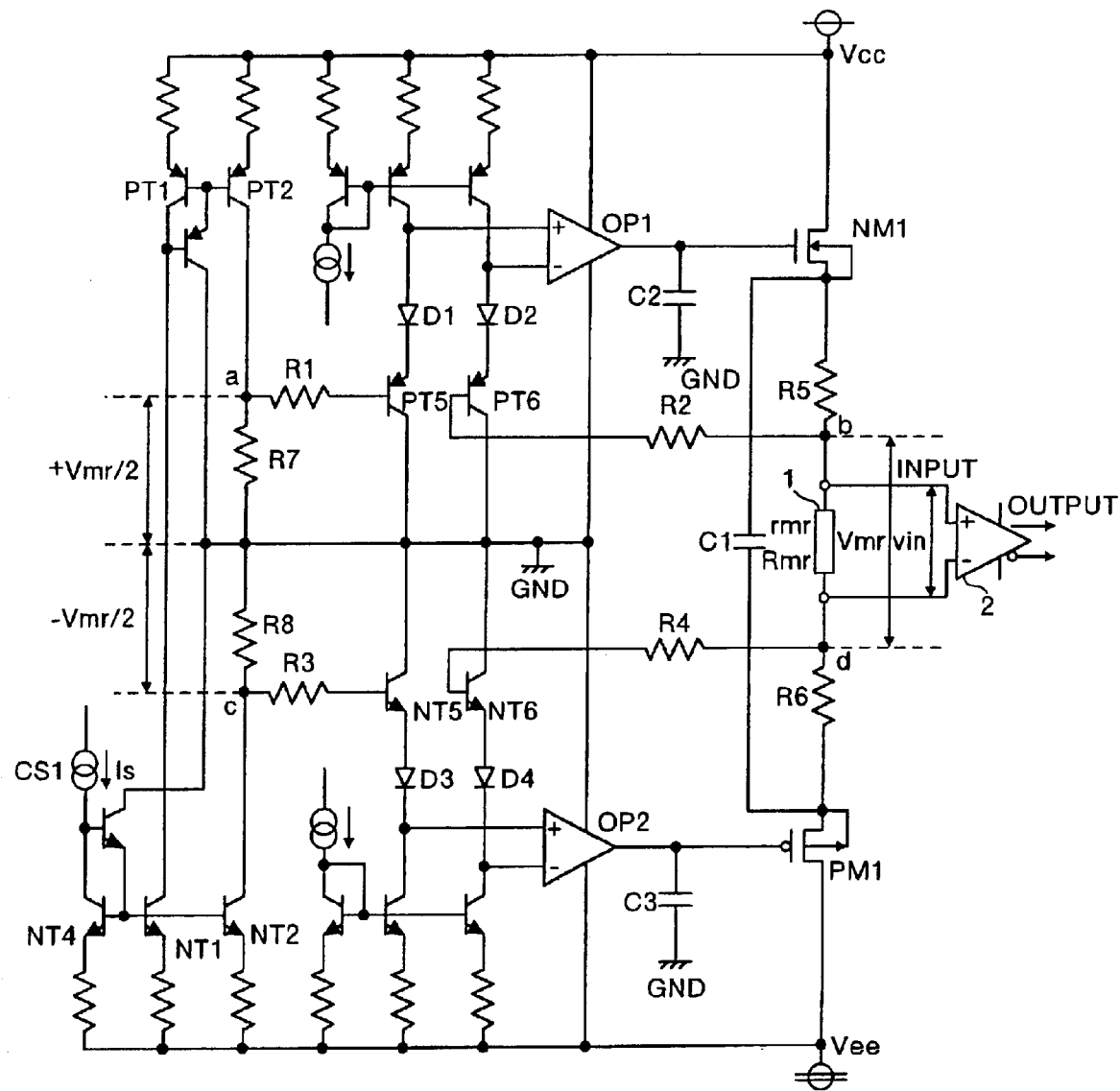
FIG. 4 shows a circuit configuration of a modification of the semiconductor integrated circuit according to the second embodiment.

The circuit shown in FIG. 4 has the same configuration as FIG. 3 except that it differs in that the current Is of the current source CS1 flows to the collector of a NPN transistor NT4. The circuit in FIG. 4 can obtain the same advantages as the circuit shown in FIG. 3.

Figure 5:
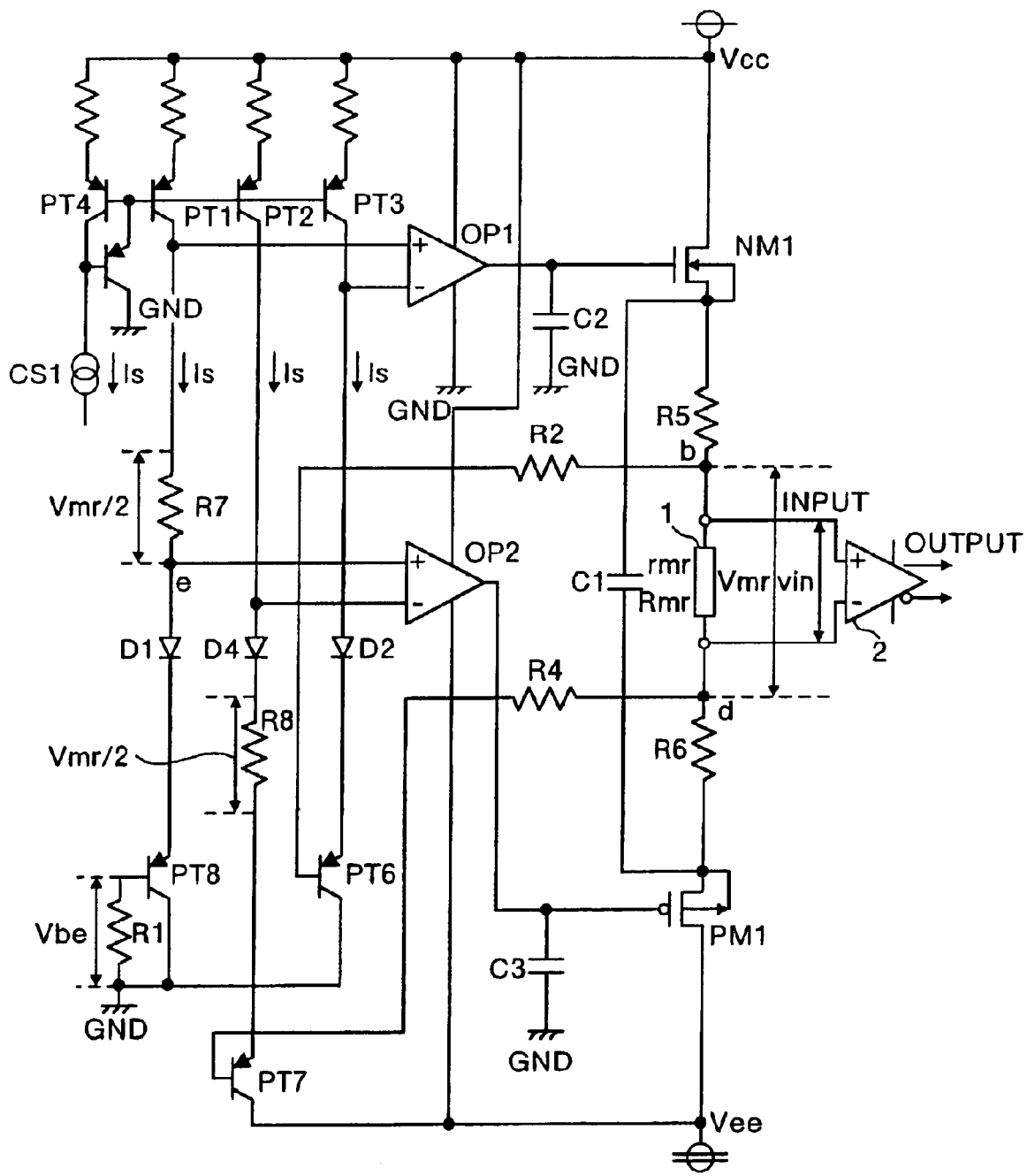
FIG. 5 shows a circuit configuration of a semiconductor integrated circuit according to a third embodiment of the present invention.

FIG. 5 shows a circuit configuration of a semiconductor integrated circuit according to a third embodiment of the present invention. A current Is flows from the collector of a PNP transistor PT4 to a current source CS1. A plurality of PNP transistors PT1, PT2, PT3, and PT4 form a current mirror circuit. The collector current of the PNP transistors PT1, PT2, PT3, and PT4 is represented as Is.

The collector current Is of the PNP transistor PT1 flows to the emitter of a PNP transistor PT8 through a resistor R7 and a diode D1. The collector of the PNP transistor PT8 is connected to a ground potential GND. The base of the PNP transistor PT8 is connected to the ground potential GND through a resistor R1.

The collector current Is of the PNP transistor PT2 flows to the emitter of a PNP transistor PT7 through a diode D4 and a resistor R8. The collector of the PNP transistor PT7 is connected to a negative power supply voltage Vee. The base of the PNP transistor PT7 is connected to a node d through a resistor R4. The node d is connected to the negative terminal of the MR head 1.

The collector current Is of the PNP transistor PT3 flows to the emitter of a PNP transistor PT6 through the diode D2. The collector of the PNP transistor PT6 is connected to the ground potential GND. The base of the PNP transistor PT6 is connected to a node b through a resistor R2. The node b is connected to the positive terminal of the MR head 1.

The collector current Is flows from PNP transistors PT1 and PT2 to the resistors R7 and R8 respectively. The resistors R7 and R8 have equal resistance. A voltage Vmr/2 which is half of the MR head bias voltage Vmr is generated due to the resistors R7 and R8 and the current Is. It is hence possible to set the MR head bias voltage Vmr by changing the current Is.

A node f of the resistor R7 is connected to the non-inversion input terminal of the operational amplifier OP1. A node e of the resistor R7 is connected to the non-inversion input terminal of operational amplifier OP2. A potential equal to Vmr/2+Vbe+Vd is applied to the non-inversion input terminals of the operational amplifier OP1. The voltage between the emitter of the PNP transistor PT8 and the ground potential GND is represented by Vbe. The voltage of the diode D1 is represented by Vd. A potential equal to Vbe+Vd is applied to the non-inversion input terminal of the operational amplifier OP2. The inversion input terminal of the operational amplifier OP1 is connected to the node b through the diode D2, the emitter and base of the PNP transistor PT6, and the resistor R2. The node b is connected to the positive terminal of the MR head 1.

The resistors R1 and R2 have equal resistance. The potential between the base and emitter of the PNP transistor PT6 is set at Vbe which is also the potential between the emitter of the PNP transistor PT8 and the ground potential GND. The potential of the diode D2 is set at Vd. The operational amplifier OP1 receives feedback from the NMOS transistor NM1. As a result a potential of +Vmr/2 is applied to the node b by imaginary short between the input terminals of the operational amplifier OP1.

The inversion input terminal of the operational amplifier OP2 is connected to the node d through the diode D4, the resistor R8, the emitter and base of the PNP transistor PT7 and the resistor R4. The node d is connected to the negative terminal of the MR head 1. The resistors R1 and R4 have equal resistance. The voltage between the base and emitter of the PNP transistor PT7 is Vbe and the voltage of diode D2 is Vd. The operational amplifier OP2 receives feedback from the PMOS transistor PM1. A potential of −Vmr/2 is applied to the node d between the input terminals of the operational amplifier OP2 by imaginary short.

The diodes D1, D2, and D4 are provided to direct the flow of the current that is input from the operational amplifiers OP1 and OP2. The provision of the diodes depends on the configuration of the operational amplifiers OP1 and OP2. Hence the diodes are not always provided. Resistors R5 and R6, capacitors C1 to C3, and AC low signal input vin are the same as the first embodiment.

According to the third embodiment, the MR head bias voltage Vmr is generated by the constant current and the resistors similar to the second embodiment. The constant current sources and the resistors use the current mirror circuits to generate the MR head bias voltage Vmr. The reference potential, which generates the MR head bias voltage, is pulled up from the ground potential GND by the voltage Vbe of PNP transistor. Hence the negative power supply voltage Vee is not got from the ground potential GND.

The current mirror circuit configured by the NPN transistors is absent in the third embodiment so that as the number of elements in the circuit is reduced. As a result, it is possible to reduce the chip size and minimize power consumption. In addition, as the number of times the current is circulated in the current mirror circuit is less, the MR head bias voltage Vmr can be accurately generated.

Figure 6:
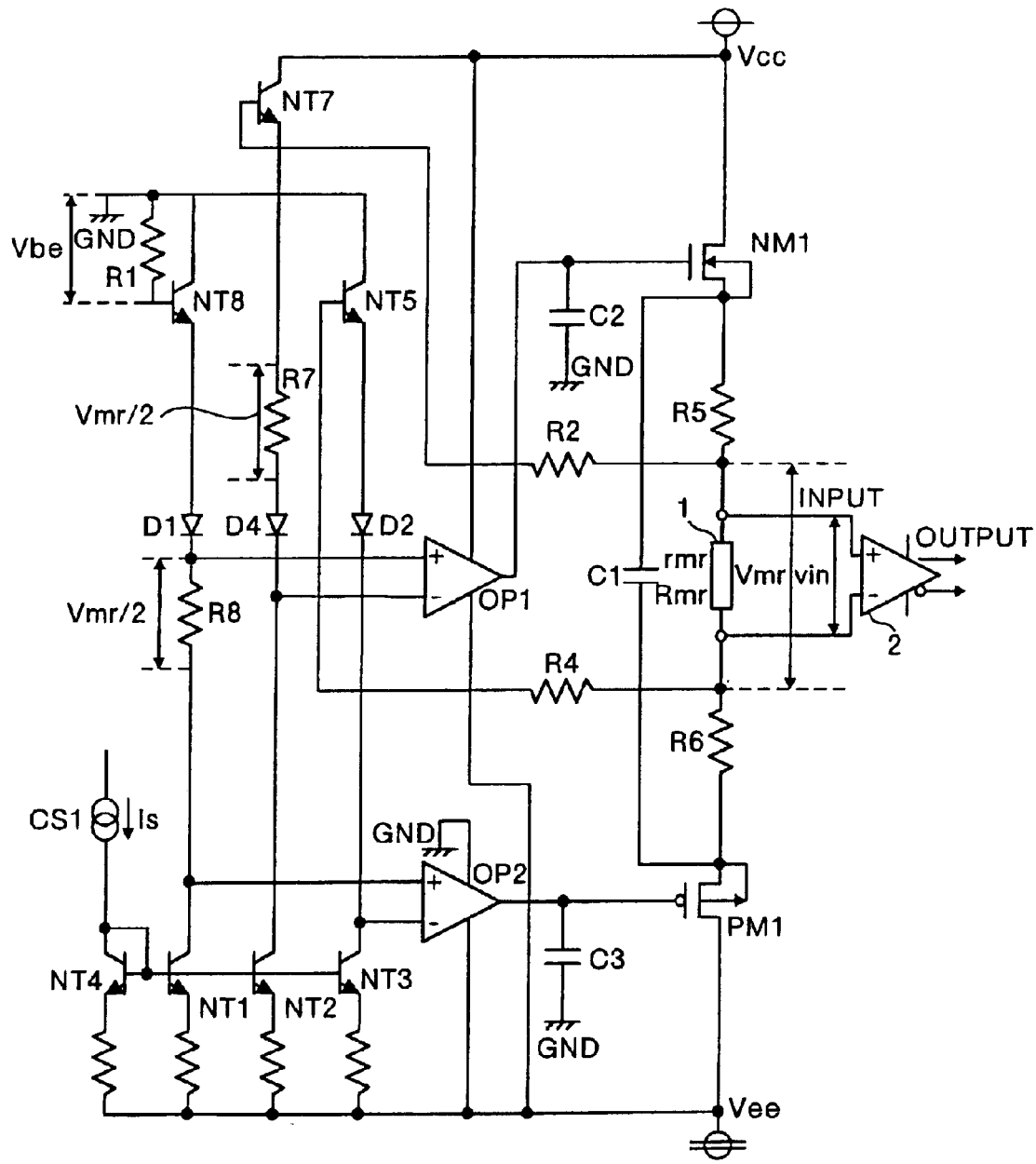
FIG. 6 shows a circuit configuration of a modification of the semiconductor integrated circuit according to the third embodiment.

The circuit shown in FIG. 6 is the same as FIG. 5 except that it differs in that the collector of an NPN transistor NT4 receives a current Is from a current source CS1. In addition, PNP transistors that are shown in FIG. 5 are replaced by NPN transistors. The circuit of FIG. 6 has the same advantages as that of the third embodiment.

According to the semiconductor integrated circuit of the present invention, a constant bias voltage is applied to both the terminals of the MR head. Moreover, the intermediate potential of the bias voltage is maintained at ground potential. The circuit hence prevents destruction by excess current and improves resistance against parasitic elements and noise.

Moreover, one terminal of the MR head has a positive constant potential and the other terminal of the MR head has a negative constant potential. The circuits that generate the positive constant voltage and negative constant potential convert the ground potential to the reference potential. The negative constant potential has the same absolute value as of the positive constant potential. In this manner it is possible to realize a semiconductor integrated circuit with a simple configuration.

Furthermore, the circuit that generates the positive constant voltage comprises of a positive voltage source, an operational amplifier, and an NMOS transistor which causes the operational amplifier to perform a feedback operation. It is therefore possible to obtain a configuration which generates a stable constant voltage.

According to the semiconductor integrated circuit of the present invention, the circuit that generates the negative constant voltage comprises of a negative voltage source, an operational amplifier, and a PMOS transistor which performs feedback to the operational amplifier. It is therefore possible to obtain a configuration which generates a stable constant voltage.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A semiconductor integrated circuit coupled to a magneto-resistive head for applying a bias voltage across first and second terminals of the magneto-resistive head and maintaining a ground potential intermediate the potential applied across the first and second terminals, the semiconductor integrated circuit comprising:

a positive constant potential circuit that supplies a positive constant potential to the first terminal and sets a reference potential to the ground potential; and a negative constant potential circuit that supplies a negative constant potential to the second terminal and sets the reference potential to ground potential, an absolute value of the negative constant potential being equal to the positive constant potential.

2. The semiconductor integrated circuit according to claim 1, wherein the positive constant potential circuit comprises:

a positive voltage source;

an operational amplifier; and a negative metal-oxide semiconductor transistor providing feedback to the operational amplifier.

3. The semiconductor integrated circuit according to claim 2, wherein the positive voltage source comprises:

a constant current source;

a current mirror circuit; and a resistor.

4. The semiconductor integrated circuit according to claim 1, wherein the negative constant potential circuit comprises:

a negative voltage source;

an operational amplifier; and a positive metal-oxide semiconductor transistor providing feedback to the operational amplifier.

5. The semiconductor integrated circuit according to claim 4, wherein the negative voltage source comprises:

a constant current source;

a current mirror circuit; and a resistor.

6. A semiconductor integrated circuit, wherein a source of a negative metal-oxide semiconductor transistor is connected to a first terminal of a magneto-resistive head through a first resistor;

a drain of the negative metal-oxide semiconductor transistor is connected to a first power source and a gate of the negative metal-oxide semiconductor transistor is connected to a first operational amplifier;

a positive voltage source connected to a non-inverting input terminal of the first operational amplifier;

an inverting input terminal of the first operational amplifier is connected to the first terminal of the magneto-resistive head;

a source of a positive metal-oxide semiconductor transistor is connected to a second terminal of the magneto-resistive head through a second resistor;

a drain of the positive metal-oxide semiconductor transistor is connected to a second power source and a gate of the positive metal-oxide semiconductor transistor is connected to a second operational amplifier;

a negative voltage source is connected to a non-inverting input terminal of the second operational amplifier; and an inverting input terminal of the second operational amplifier is connected to the second terminal of the magneto-resistive head.

7. The semiconductor integrated circuit according to claim 6, wherein the positive voltage source comprises:

a constant current source;

a current mirror circuit; and a third resistor.

8. The semiconductor integrated circuit according to claim 6, wherein the negative voltage source comprises:

a constant current source;

a current mirror circuit; and a third resistor.

* * * * *